United States Patent Office 3,637,578
Patented Jan. 25, 1972

3,637,578
POLYESTER-POLYPHENYLENE ETHER
MIXED RESINS
Carl L. Wright, Severn, and Harry H. Beacham, Severna Park, Md., assignors to FMC Corporation, New York, N.Y.
No Drawing. Continuation-in-part of application Ser. No. 699,813, Jan. 23, 1968. This application Apr. 23, 1970, Ser. No. 31,407
Int. Cl. C08f 43/06; C08g 43/02
U.S. Cl. 260—40 R
8 Claims

ABSTRACT OF THE DISCLOSURE

Thermosetting resin compositions of improved qualities made by combining a high-temperature thermoplastic resin, i.e., a polyphenylene ether polymer with mixtures of reactive monomers and reactive-type polyester resins, each containing polymerizable carbon-to-carbon unsaturation. The polyphenylene ether polymers combine with these polymerizable materials containing carbon-to-carbon unsaturation in the presence of a free radical catalyst. The compositions are formed by moderate heat and pressure into articles with excellent electrical and mechanical properties which are retained at elevated temperatures, and under conditions of high humidity.

CROSS-REFERENCE TO RELATED APPLICATIONS

This application is related to application Ser. No. 682,326, filed Nov. 13, 1967 entitled "Thermosetting Resin Compositions," now U.S. Pat. No. 3,557,045 issued Jan. 19, 1971, and is a continuation-in-part of application Ser. No. 699,813, filed Jan. 23, 1968 entitled "Thermosetting Resin Compositions," now abandoned.

BACKGROUND OF THE INVENTION

(A) Field of the invention

This invention is concerned with high performance thermosetting resinous materials that are useful where excellent electrical and mechanical characteristics are required at normal or elevated temperatures, and under conditions of high humidity. The compositions disclosed are considered to be useful for structural parts of high speed aircraft, electrical insulating components of communications equipment, detecting, control and computing devices, printing plates and chemical process equipment.

(B) Description of the prior art

There is an ever growing need for resinous materials of improved electrical and mechanical qualities, particularly where these qualities must be maintained at elevated temperatures or in other adverse environments such as high humidity or chemically corrosive conditions. These high performing plastic materials are required in structural parts of high speed aircraft, electrical insulating components of communications, detecting, control and computing devices and chemical processing equipment.

Two approaches have been taken in the development of resinous materials that meet high performance requirements: (1) the synthesis of linear polymer molecules with high melting points—the so-called engineering thermoplastics, and (2) the production of materials capable of attaining three-dimensional rigidity through a high degree of chemical crosslinking of polymer chains.

High performance thermoplastic materials characteristically are composed of highly ordered, linear chains capable of orientation into very closely-packed molecular configurations in which a maximum number of secondary valence bond forces can resist the molecular motions of melting. Among such materials are the linear polyamides, such as nylons, linear polyesters such as the polycarbonates of bisphenols, the polyacetals, such as polymethylene oxide, certain isotactic polyolefins and recently the polyphenylene ether polymers. These materials possess high physical strength and toughness qualities at ordinary temperatures.

Thermoplastics are subject to the phenomenon known as "creep," or the tendency to distort when subjected to stresses over long periods of time; also "creep" increases as the temperature increases. The utility of thermoplastics under stress is thus limited to temperatures much below those at which the materials actually melt or to continuously applied stresses which are much lower than required for actual rupture.

Fabrication techniques for thermoplastic materials require economically fast flow of the plastic, therefore, processing of these high temperature thermoplastics into molded articles is generally carried out at temperatures much above the maximum temperatures at which the materials are useful. Thermoplastics which have useful strength characteristics at 150° C., for example, are generally molded at temperatures in excess of 300° C. High processing or molding temperatures require costly precautions and limit the use of such materials. Another shortcoming of thermoplastics is that they all are subject to solvation, either complete or partial, in solvents which, although specific to a particular plastic, are frequently encountered in commercial use.

Thermosetting resins acquire resistance to melting through the formation of primary covalent intermolecular chemical bonds during curing. Generally the higher the concentration of these intermolecular bonds, commonly called crosslinks, the higher the melting or heat distortion temperature of the resin. Thermoset resins are typically synthesized as reactive low molecular weight, soluble, thermoplastic polymers or simple molecules which are converted through chemical action into insoluble, infusible articles during the fabrication process.

The fabrication processes for thermosetting resins, such as molding, laminating or casting, are usually carried out at temperatures below the maximum temperature at which the thermoset material retains useful strength characteristics. Because thermoset resin molecules in the cured state are intermolecularly linked by primary valence bonds they are relatively free of "creep" phenomena. In general the higher the concentration of crosslinks the higher the resistance of the cured resin to distortion under stress as the temperature is increased. Thermosetting resins, because they do not creep, retain useful mechanical strength characteristics at temperatures much closer to the heat distortion temperature than do thermoplastics. Increasing the crosslinking density increases the heat distortion temperature of thermoset resins; unfortunately this also increases rigidity which causes a loss of shock resistance due to embrittlement.

Thermosetting resins useful at elevated temperatures include phenol-, urea-, and melamine-, formaldehyde condensates, unsaturated polyester resins, epoxy resins and allylic polymers. Each of these thermosetting resins can be formulated to yield a variety of crosslinked densities in the cured state. These materials have found wide use in the plastics industry.

Efforts have been made to obtain improved resinous compositions by blending thermoplastic and thermosetting resins. Other than condensation type thermosetting resins in combination with thermoplastic resins such as phenolic resins with polyvinyl butyral resins, blends of the two types of resins have generally proved to be incompatible. The three-dimensional net-work structures of thermosetting resins normally cannot accommodate more than small quantities of linear thermoplastic resin molecules. Curing the thermosetting resins containing incompatible thermoplastic resins forces the thermoplastic resin out of the thermosetting structure, resulting in syneresis or "blooming" on the surface. Though some measure of apparent compatibility is occasionally found, the resultant properties of the combination are poor. Mechanical properties are usually much poorer than for either system alone, as the cured resin tends to be "cheesy" and resistance to distortion under load is no better than for the thermoplastic resin alone.

Our copending application Ser. No. 682,326 filed Nov. 13, 1967 now U.S. Pat. No. 3,557,045 issued Jan. 19, 1971 discloses compatible resin compositions containing thermoplastic polyphenylene ether polymers and thermosetting allylic prepolymers and monomers. The compositions disclosed in Ser. No. 682,326 have good physical properties and resistance to creeping under stress.

SUMMARY OF THE INVENTION

We have now discovered thermosetting plastic compositions comprising (a) 10–95% of a polymerizable mixture of reactive monomer and reactive-type polyester, that is, of a polyester resin in which at least about 50% of the dibasic acid portion of the polyester should be an unsaturated dibasic, organic acid containing four carbon atoms and the alcohol moiety of which is a difunctional glycol containing 2 to 8 carbon atoms which may be cyclic or acyclic, each of the components of the mixture comprising at least 5% of the total composition; (b) 90–5% of a polyphenylene ether polymer having a repeating structural unit of the formula

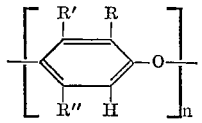

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom and halohydrocarbonoxy carbon atoms having at least two carbon atoms between the halogen atom and phenol nucleus and being free of tertiary α-carbon atoms, R′ and R″ are both monovalent substituents which are the same as R and in addition, halogen; and (c) free radical catalyst in sufficient amount to convert the polymerizable monomer and/or resin-polyphenylene ether resin mixture to the thermoset state upon the application of heat. Surprisingly, when cured to the thermoset state, these compositions exhibit excellent electrical and mechanical properties which are retained at elevated temperatures.

The physical form of these novel compositions in the uncured state at room temperature varies from liquid slurries to dry powders. Because of the varied physical forms available, a variety of curing conditions are used, depending on the pressure required to form the system at the fusion point. Quite surprisingly, most of the conventional molding techniques for thermosetting resins may be used for the compositions of this invention including casting of the very liquid systems, vacuum-bag molding, autoclave molding at 50–300 p.s.i., matched metal molding at 100–500 p.s.i., and high-pressure compression and transfer molding at 500–10,000 p.s.i. This is true even for compositions high in polyphenylene ether resins and those with polyphenylene ether resins and solid polymerizable polymers.

These compositions can be used in preparing laminates either by the wet lay-up or prepreg technique. These compositions are used with solvents in preparing coatings and insulating varnishes. The compositions can be compounded with or without fillers and reinforcing materials in molding and casting compositions.

DESCRIPTION OF THE INVENTION AND THE PREFERRED EMBODIMENTS

All of the polyphenylene ether polymers currently available have been found to be useful in practicing this invention. One method of producing polyphenylene ether polymers is described in U.S. Pat. 3,306,875 issued Feb. 28, 1967. We have used three polyphenylene ether polymers available from the General Electric Company, Noryl and grades 631–101 and 631–111, and found them all to be useful in practicing our invention. As far as we know all the polyphenylene ether polymers known in the art are useful in practicing this invention.

The polyester resins used in this invention whether liquid or solid, should be of the reactive type, that is, at least about 50% of the dibasic acid portion of the polyester should be an unsaturated dibasic organic acid such as maleic or fumaric acid. The alcohol moiety of the polyester is generally a saturated, difunctional glycol containing 2–8 carbon atoms and may be cyclic or acyclic. Uncut isophthalic polyester resins such as Dion 6421, available from Diamond Alkali Co., and uncut chlorinated polyester resins, such as Hetron 19, available from Durez Plastics Division, Hooker Chemical Co., can also be incorporated in the compositions of this invention.

A reactive polyester may be prepared by reacting equal molar amounts of maleic anhydride and diethylene glycol at a temperature above 200° C. Water is azeotropically removed. The distillate is analyzed from time to time for starting ingredients and a sufficient amount of the material lost in excess may be added to the reactor to maintain the initial proportions of reacting ingredients. After eight hous at such a temperature a polyester is obtained in the form of a stiff liquid with an acid number of about 18.

A solid reactive polyester can be prepared by reacting equal molar amounts of a mixture of maleic anhydride and isophthalic acid with a 10% excess of propylene glycol. Water is removed azeotropically. The reaction is continued with heating until the acid number of the reaction mixture falls below 5. Excess unreacted propylene glycol is removed under vacuum and a solid polyester is obtained.

Monomers useful in practicing this invention have a boiling point of at least 70° C. and contain carbon-to-carbon double bond unsaturation such as vinyl monomers, monomers based on acrylic acid and allyl esters of polybasic acids. Typical vinyl monomers include styrene, chlorostyrene, α-methyl styrene, vinyl toluene, phenyl α-methyl styrene ketone, divinyl benzene, vinyl acetate, vinyl 2-chloroethyl ether, N-vinyl pyrrolidone, 2-vinyl pyridine. Typical acrylic acid based monomers include methyl methacrylate (MMA), methyl acrylate (MA), acrylamide, N-tert-butyl acrylamide, acrylonitrile, hexahydro-1,3,5-triacrylo-s-triazine and ethyl methacrylate.

The typical allyl derived monomers include diallyl phthalate, diallyl isophthalate, diallyl chlorendate, triallyl cyanurate, diallyl fumarate, dialyl maleate and allyl diglycol carbonate. So far as is known to the inventors, all monomers known to copolymerize with unsaturated polyester resins are useful to some extent in practicing this invention.

Other materials containing polymerizable carbon-to-carbon unsaturation useful in practicing this invention include allylic prepolymers and polydienes. The amount of these polymers can vary between about 0 and 50%, by weight, of the total composition. Diallyl phthalate, diallyl isophthalate and diallyl orthophthalate prepolymers and polybutadiene are useful resins in practicing this aspect of the invention.

Polymerizable materials must contain carbon-to-carbon unsaturation and can be solid materials such as solid reactive polyesters or allylic prepolymers. Liquid polymerizable materials containing carbon-to-carbon double bond unsaturation, generally monomers or combinations of monomers with liquid reactive polyesters are important in these novel compositions. The ratio of polymerizable materials to the polyphenylene ether polymer should lie between 5:95 and 95:5. An unsaturated polymer generally imparts better viscosity and handling characteristics to the composition than does a polymerizable monomer. However, at least 5 of the 5:95% polymerizable material must be monomer.

The diallylic phthalate prepolymers, diallyl orthophthalate and diallyl isophthalate, used in this invention are manufactured in a conventional fashion by polymerizing a monomeric material to produce a solution of the soluble prepolymer in monomer, to a point short of gelatine, which occurs when the molecular weight of the prepolymer reaches a point where it becomes insoluble in the monomer. These prepolymer-monomer solutions (called "dopes") are then separated into a solvent soluble prepolymer fraction, and monomer. This may be done by treatment with a solvent which dissolves the monomer while precipitating the prepolymer, or by other means which will leave a soluble prepolymer substantially free of monomer. A typical method of separating such polymers is described by Willard in U.S. Pat. 3,030,341, issued Apr. 17, 1962. These prepolymers are solids containing little or no monomer; they can be stored indefinitely in this form, since they require a catalyst and either heat or actinic light to convert them to the insoluble stage.

We have found that in addition to allylic prepolymers the gel polymers of allylic monomers such as are described in U.S. patent applications Ser. No. 637,320, filed Apr. 20, 1967, now U.S. Pat. No. 3,368,996, issued Feb. 13, 1968, and Ser. No. 554,669, filed June 2, 1966, now U.S. Pat. No. 3,483,158, issued Dec. 9, 1969, can also be used in practicing this invention.

The novel compositions of this invention employ a free radical catalyst in sufficient amount to convert the polymerizable monomer and/or resin-polyphenylene ether resin mixture to the thermoset state upon the application of heat. The peroxide catalyst which promotes the interaction between the unsaturated monomer and/or resin containing carbon-to-carbon unsaturation does not have to exclude homopolymerization, but must be a catalyst that does not yield only homopolymers. We have found catalysts which have a ten hour half-life in benzene at a temperature in excess of 100° C. should be used to some extent to catalyze the reaction of this invention. Mixed catalysts may be used, but at least part of the catalyst must be a catalyst having a ten hour half-life at a temperature in excess of 100° C. in benzene. We have successfuly used dicumyl peroxide, tertiary buytl perbenzoate and 2,5-dimethyl-2,5-di(tert-butylperoxy) hexyne-3 alone or in combination with benzoyl peroxide. We have found dicumyl peroxide gives the best results in laminates and tertiary butyl perbenzoate the best results in molding compositions where the compositions contain allylic monomers or prepolymers. In any even the catalysts well known in the art to promote the cure of allylic compositions are generally useful in practicing this invention.

The molding compositions of this invention may be premixed, powdered, granular or dough type. The molding compositions are prepared in conventional equipment well known in the plastics industry to be useful in compounding diallyl phthalate, epoxy and polyester molding compounds. The molding compositions may be filled or unfilled. The polyphenylene ether resin, polymerizable monomer, reactive polyester resin, free radical catalyst, internal mold release, pigment inhibitor, etc. are simply mixed together in a heavy duty mixer. The mixing may be done with or without the use of solvents. However, if solvents are used they should be removed from the pre-mixed compound before molding. The molding compositions can be molded under conditions normally used for allylic molding compositions, i.e., they are molded at from about 130° to 180° C. for about 1 to 60 minutes. Because of the varied viscosities of these novel molding compositions the molding pressure can vary from about zero (0) to 10,000 p.s.i. depending on the composition.

A wide variety of water insoluble, inert inorganic fillers may be used in these molding compositions. Fillers which can be used in practicing this invention include calcium carbonate, both precipitated and wet ground types, calcium silicate, ground silica, calcined clays, chalk, limestone, calcium sulfate (anhydrous), barium sulfate, asbestos, glass (powdered), quartz, aluminum trihydrate, aluminum oxide, antimony oxide, inert iron oxides, and ground stone such as granite, basalt, marble, limestone, sandstone, phosphate rock, travertine, onyx and bauxite. Additionally, inert fibrous materials may be used such as synthetic fibers, glass fibers, asbestos and cellulosic fibers. Up to 300 parts by weight of filler and/or fiber per 100 parts by weight of polyester-monomer-polyphenylene ether resin may be used in these molding compositions.

A series of molding compositions, representative of this invention, was prepared by blending 5–40 parts of polyphenylene ether resin with 20–35 parts of styrene monomer and 40–60 parts of a reactive type polyester of the 1 to 1 maleic-isophthalic type to which was also added two parts of dicumyl peroxide, by weight, per 100 parts of total resin. The samples were molded in a flat bed press at 100 p.s.i. and cured for 20 minutes at 150° C., and then evaluated for physical and electrical properties. Although styrene polyester molding compositions are not particularly known for their good electrical properties, these compositions quite surprisingly have electrical properties very nearly as good as molded diallyl phthalate compositions which are known for their outstanding electrical properties. Similar molding compounds were prepared by replacing styrene with other polymerizable monomers.

The novel resin compositions of this invention are readily used in preparing glass reinforced laminates by the wet lay-up technique. Wet lay-ups are prepared by making a liquid blend of a polymerizable liquid, i.e., a monomer such as diallyl orthophthalate, polyphenylene ether polymer, reactive type polyester catalyst and where desired an allylic prepolymer or reactive polyester, and other modifying ingredients such as dyes, pigments, fillers, inhibitors, glass coupling agents and so forth, which is poured onto one or more layers of a fibrous non-woven glass mat or woven glass fabric, which has preferably been treated with a glass coupling agent, to impregnate the reinforcing glass; after impregnation the product is laminated under heat and mild pressures according to procedures well known in the art to be useful for curing allylic resin laminates.

A typical slow cure is effected by placing the wet lay-up in a vacuum bag and applying a vacuum of 28 to 29.5 inches of mercury for about 5 hours to remove bubbles; the evacuated lay-up is then pressed at 30 to 50 p.s.i. for 30 minutes at 82° C., 60 minutes at 104° C., 30 minutes at 141° C., 15 minutes at 149° C., and then cured an additional 60 minutes at 149° C. in a laminating press under contact pressure. Thin sections can be cured more rapidly; for example 30 to 50 p.s.i. for 60 minutes at 149° C. The amount of glass in the lay-up can be as high as 80% and the preferred amount of reinforcing glass is 50 to 75%.

The novel resin compositions of this invention can be employed in the usual process for manufacture of fibrous reinforced thermoset resin laminates using the prepreg technique using non-volatile monomers. A nonvolatile monomer such as diallyl orthophthalate and the like, polyphenylene ether polymer, reactive polyester resin, catalyst and where desired modifying ingredients such as dyes, pigments, fillers, glass coupling agents, inhibitors and so forth are mixed together and used to impregnate a fibrous non-woven mat or a woven fabric; where glass mats or fabrics are used it may be desirable to have the glass treated with a glass coupling agent. The use of some solvent is usually required in order to reduce the viscosity level of the resin composition to make it suitable for application to the mat or fabric with conventional commercial saturating or impregnating equipment.

In the compositions of this invention it is not necessary to dissolve the polyphenylene ether resin. Simple uniform dispersion of the polyphenylene ether resin powder in the solvent-monomer-polymerizable resin mixtures suffices. Prepregs are generally most economically processed with 30 to 60 parts of the resin composition dispersed in 70 to 40 parts of a suitable solvent such as acetone, methylethyl ketone, methyl isobutyl ketone, toluene, xylene, chloroform, methylene chloride, trichlorethylene, perchlorethylene and mixtures thereof and other solvents known in the trade to be useful in preparing allylic prepregs.

The mat or fabric is impregnated with the solvent solution and then dried to remove the solvent. After impregnation and drying of the impregnated fabric the laminate is laid up and cured with heat and mild pressure using cure cycles and conditions similar to those used in curing the wet lay-up type laminates. Roving, including glass roving, is similarly preimpregnated for processing by filament winding techniques into pipe, other cylindrical shapes and hollow tapered and conical shapes. Products made by filament winding are generally cured at about 150° C. in 60 minutes. The fiber content of the prepreg laminates varies from about 15 to about 40% by weight for low density fibers and up to about 55 to 75% of the total weight of the cured laminate for glass mat or glass fabric laminates. The fiber content of filament wound constructions such as pipe, when made from impregnated glass roving, is generally about 70 to 80% of the total weight of the cured product.

Reinforced laminates of fibrous materials such as glass cloth, glass mats, synthetic fiber, cloth mats, paper and the like can be copper-clad to produce copper-clad laminates with excellent electrical properties to be used in preparing printed circuits and the like. The copper-clad laminates are prepared by coating copper foil with a polyphenylene ether resin coating and then baking the coated copper foil at 160° C. for about 15 minutes. The baked resin coated foil is then placed on resin impregnated fibrous materials such as glass cloth which has been impregnated with the novel resin compositions of this invention which contain at least about 10% or more polyphenylene ether resin and then the "laminate" is pressed at 50 to 2,000 p.s.i. at 100 to 170° C. for at least 5 minutes to convert the resinous materials to the thermoset state. As indicated above dicumyl peroxide is the preferred catalyst for producing the copper-clad laminates of this invention. The resulting copper-clad laminate has excellent adhesion of the copper to the base material which has excellent electrical properties. Quite surprisingly when tested according to NEMA Standards Publication LI-1-1966, but at up to 200° C. rather than the 25° C. standard, these copper-clad laminates retained essentially all of their electrical properties as measured at room temperature.

Compositions containing a polyphenylene ether polymer, a polymerizable liquid, such as allylic monomer and prepolymer, and polyester resin were found to be very useful in practicing this invention. Where allylic prepolymers and allylic monomers are used it was found to be very useful to use an allylic composition which results from the polymerization of the monomer to produce prepolymer in solution in the monomer. However, prepolymer may be simply dissolved in the monomer and used in the compositions of this invention. In the first alternative about 25% by weight of prepolymer in monomer represents about the maximum amount of prepolymer in monomer that can be obtained without gelling the prepolymer-monomer solution. In these compositions the ratio of monomer, prepolymer and polyester to polyphenylene ether resin should be between 5:95 and 95:5. These compositions were moldable, and could be dissolved or dispersed in a solvent and used for preparing glass laminates by the prepreg technique. Similar diallyl isophthalate polymerdiallyl isophthalate monomer mixtures were used in molding compounds and prepreg laminates with similar results.

The compositions of this invention can be dissolved in suitable solvents to form coating solutions. These solutions may be applied to substrates such as metal, plastics and wood; dried and cured at about 300° F. to give clear surface films with excellent adhesion, toughness and high heat and chemical resistance.

The test methods appearing in the following list were followed in testing the molded specimen made from the various compositions disclosed in the examples.

(A) Flexural strength [1] _____ ASTM D–790
(B) Modulus of elasticity _____ ASTM D–790
(C) Tensile strength _____ ASTM D–638
(D) Izod impact _____ ASTM D–256
(E) Compressive strength _____ ASTM D–695
(F) Deflection temperature _____ ASTM D–648
(G) Water absorption _____ ASTM D–570(a)
(H) Specific gravity _____ ASTM D–792
(I) Dielectric _____ ASTM D–150
(J) Dissipation factor [2] _____ ASTM D–150
(K) Volume and surface resistivity _ ASTM D–257
(L) Flame resistance _____ ASTM D–229
(M) Hardness _____ ASTM D–785

[1] The flexural strengths at 150° C. for the unfilled resin systems were obtained after ½ hour conditioning at 150° C. Each individual specimen was held to ½ hour conditioning to avoid any ambiguity that may be caused by post-curing in the test oven. Only maximum flexural yield was measured.

[2] The wet test is conducted on samples which were conditioned by immersing the samples for 24 hours at 23° C. in distilled water removing the samples, blotting them dry and then testing the samples as soon as practical according to the test method.

The following examples, illustrating the novel products disclosed herein, are given without any intention that the invention be limited thereto. All parts and percentages are by weight.

EXAMPLE 1

A commercial reactive type polyester of the 1:1 maleic-isophthalic type (Dion–ISO 6421, available from Diamond Alkali Chemical Company) was dissolved in styrene monomer in the proportions listed in Table 1. Polyphenylene ether polymer was blended by stirring with the solutions given in Table 1 various amounts of polyphenylene ether resin together with 2 parts of dicumyl peroxide per 100 parts of polyester, styrene, polyphenylene ether mixture. One-eighth inch thick sheets of the compositions were molded in a flat bed press at 150° C. and 200 p.s.i. for twenty minutes. The proportions of the compositions and the physical properties obtained on the cured sheets are listed in Table 1.

TABLE 1.—MOLDED POLYPHENYLENE ETHER POLYMER-STYRENE POLYESTER COMPOSITIONS

| | Comparison Example | 1-1 | 1-2 | 1-3 | 1-4 | 1-5 | 1-6 |
|---|---|---|---|---|---|---|---|
| Polyphenylene ether resin | 0 | 5 | 10 | 15 | 20 | 30 | 40 |
| Styrene monomer | 35 | 35 | 30 | 30 | 25 | 25 | 20 |
| Polyester resin [1] | 65 | 60 | 60 | 55 | 55 | 45 | 40 |
| Dicumyl peroxide | 2 | 2 | 2 | 2 | 2 | 2 | 2 |
| Izod (ft. lbs.) | 2.966 | 0.750 | 1.603 | 1.023 | 1.232 | 1.314 | 1.881 |
| Rockwell M | 110 | 106 | 98 | 102 | 104 | 103 | 101 |
| Flexural Strength (p.s.i.) at: | | | | | | | |
| 25° C | 14,100 | 10,220 | 10,800 | 8,190 | 10,450 | 9,190 | 10,650 |
| 150° C | 556 | 424 | 438 | 543 | 881 | 972 | 1,990 |
| Flexural modulus (p.s.i.) at: | | | | | | | |
| 25° C. (×$10^5$) | 5.77 | 5.05 | 4.97 | 4.78 | 5.71 | 4.99 | 4.74 |
| 150° C. (×$10^5$) | 1.01 | 0.85 | 0.99 | 1.19 | 1.86 | 2.78 | 0.58 |
| Tensile strength (p.s.i.) | 3,960 | 4,190 | 5,270 | 5,250 | 3,120 | 5,630 | 6,060 |
| Water absorption (percent) | 0.45 | 0.47 | 0.50 | 0.44 | 0.49 | 0.37 | 0.37 |
| Specific gravity | 1.201 | 1.188 | 1.178 | 1.188 | 1.199 | 1.170 | 1.161 |
| Dielectric constant: | | | | | | | |
| $10^3/10^6$ HZ dry | 3.05/3.00 | 3.04/3.00 | 3.01/2.97 | 3.00/2.96 | 3.04/2.98 | 2.96/2.94 | 2.91/2.89 |
| $10^3/10^6$ HZ wet | 3.11/3.06 | 3.15/3.09 | 3.07/3.04 | 3.04/3.03 | 3.04/3.01 | 3.00/2.98 | 2.95/2.92 |
| Percent dissipation factor: | | | | | | | |
| $10^3/10^6$ HZ dry | .535/.636 | .470/.630 | .502/.595 | .438/.541 | .400/.577 | .327/.446 | .267/.403 |
| $10^3/10^6$ HZ wet | .434/.775 | .491/1.024 | .424/.716 | .412/.634 | .414/.621 | .302/.489 | .378/.453 |
| Volume resistivity (ohm-cm.) | .107×$10^{16}$ | 2.56×$10^{16}$ | 4.81×$10^{15}$ | 9.41×$10^{15}$ | 8.92×$10^{15}$ | 2.56×$10^{15}$ | 7.62×$10^{15}$ |
| Surface resistivity | 7.03×$10^{15}$ | 7.40×$10^{15}$ | 6.11×$10^{15}$ | 7.40×$10^{15}$ | 7.03×$10^{15}$ | 7.81×$10^{15}$ | 5.41×$10^{15}$ |

[1] Dion ISO 6421—1:1 maleic-isophthalic polyester resin available from Diamond Alkali Co.

NOTE.—HZ=Cycles per second.

EXAMPLE 2

Molding compositions were prepared by dissolving a polyester resin in several different monomers. Fifty-two parts by weight of a 2 to 1 maleic-isophthalic reactive polyester was dissolved in 28 parts each, of styrene, divinylbenzene (50%) and methyl methacrylate monomers. Twenty parts of polyphenylene ether polymer and 2 parts of a peroxide catalyst were stirred into each solution. Each composition was molded into a ⅛ inch thick sheet in a flat bed press. The samples were molded at 100 p.s.i. and 150° C. for 20 minutes. The composition details and physical properties of the molded sheets are listed in Table 2.

EXAMPLE 3

A series of molding compositions was prepared by dissolving a 2 to 1 maleic-isophthalic reactive polyester resin in several monomers. The proportions of resin and monomer are listed in Table 3. Twenty parts of polyphenylene ether polymer and two percent dicumyl peroxide, based on the total weight of the polymerizable materials, were stirred into each of the polyester resin-monomer solutions. The molding compositions were molded into a ⅛ inch thick sheet in a flat bed press. The samples were molded at 100 p.s.i. and 150° C. for 20 minutes. The com-

TABLE 2.—MOLDED POLYPHENYLENE ETHER-CUT POLYESTER COMPOSITIONS

| | Comparison Example | 2-1 | 2-2 | 2-3 | 2-4 | 2-5 |
|---|---|---|---|---|---|---|
| Polyester resin [1] | 65 | 52 | 52 | 52 | 52 | 52 |
| Polyphenylene ether polymer | | 20 | 20 | 20 | 20 | 20 |
| Styrene monomer | 35 | 28 | 28 | 28 | | |
| Divinyl benzene (50%) | | | | | 28 | |
| Methylmethacrylate | | | | | | 28 |
| Dicumyl peroxide | 2 | 2 | | | 2 | 2 |
| Tertiary butyl perbenzoate | | | 2 | 1 | | |
| Benzoyl peroxide | | | | 1 | | |
| Rockwell M | 110 | 104 | 103 | 106 | 110 | 106 |
| Izod (ft. lbs./in.) | 2.97 | 1.23 | 3.00 | 3.14 | 1.42 | 2.78 |
| Flexural strength (p.s.i.) at: | | | | | | |
| 25° C | 14,100 | 10,450 | 18,950 | 17,880 | 9,950 | 18,810 |
| 150° C | 556 | 881 | 1,740 | 1,840 | 2,010 | 1,080 |
| Flexural modulus (p.s.i.) at: | | | | | | |
| 25° C | 5.77 | 5.71 | 5.39 | 5.31 | 5.57 | 5.10 |
| 150° C | 1.01 | 1.85 | 0.30 | 0.35 | 0.83 | 0.18 |
| Tensile strength (p.s.i.) | 3960 | 3120 | 4070 | 4800 | 3630 | 9340 |
| Water asborp. (percent) | 0.45 | 0.49 | 0.42 | 0.43 | 0.44 | 0.52 |
| Specific gravity | 1.201 | 1.199 | 1.180 | 1.193 | 1.190 | 1.231 |
| Dielectric constant: | | | | | | |
| $10^3/10^6$ HZ (dry) | 3.05/3.00 | 3.04/2.98 | 2.95/2.91 | 2.96/2.93 | 2.94/2.92 | 3.13/3.02 |
| $10^3/10^6$ HZ (wet) | 3.11/3.06 | 3.04/3.01 | 2.98/2.94 | 3.01/2.99 | 2.94/2.92 | 3.19/3.06 |
| Dissipation Factor: | | | | | | |
| (Percent) $10^3/10^6$ HZ (dry) | .535/.636 | .400/.577 | .392/.488 | .425/.546 | .504/.545 | 1.44/.892 |
| (Percent) $10^3/10^6$ HZ (wet) | .434/.775 | .414/.621 | .353/.544 | .405/.631 | .426/.605 | 1.47/.965 |
| Volume resistivity (×$10^{15}$ ohm-cm.) | 10.7 | 8.98 | 10.6 | 21.6 | 10.0 | 9.3 |
| Surface resistivity (×$10^{15}$ ohm) | 7.03 | 7.03 | 4.69 | 9.37 | 7.02 | 5.7 |

[1] Dion 6427—commercial polyester resin available from Diamond Alkali Co.

NOTE.—HZ=Cycles per second.

position details and physical properties of the molded sheets are listed in Table 3.

TABLE 3.—POLYPHENYLENE ETHER POLYMER-CUT POLYESTER COMPOSITIONS

|  | 3-1 | 3-2 | 3-3 | 3-4 |
|---|---|---|---|---|
| Polyphenylene ether polymer | 20 | 20 | 20 | 20 |
| Polyester resin [1] | 40 | 32 | 40 | 40 |
| Diallyl isophthalate | 40 |  |  |  |
| Diallyl chlorendate |  |  | 15 |  |
| Triallyl cyanurate |  | 18 |  | 15 |
| Diallyl phthalate |  | 30 | 25 | 25 |
| Dicumyl peroxide | 2 | 2 | 2 | 2 |
| Izod (ft. lbs.) | 1.29 | 1.64 | 1.76 | 1.20 |
| Rockwell M | 109 | 110 | 111 | 111 |
| Flexural strength (p.s.i.) at: |  |  |  |  |
| 25° C | 12,420 | 12,400 | 13,080 | 9,580 |
| 150° C | 2,760 | 4,770 | 3,450 | 3,920 |
| Flexural modules (p.s.i.) at: |  |  |  |  |
| 25° C | $5.16 \times 10^5$ | $5.09 \times 10^5$ | $5.27 \times 10^5$ | $5.35 \times 10^5$ |
| 150° C | $1.31 \times 10^5$ | $1.31 \times 10^5$ | $1.12 \times 10^5$ | $1.81 \times 10^5$ |
| Water absorption (percent) | +0.51 | +0.49 | +0.44 | +0.60 |
| Specific gravity | 1.241 | 1.250 | 1.285 | 1.255 |
| Dielectric constant: |  |  |  |  |
| $10^3/10^6$ HZ (dry) | 3.20/3.10 | 3.30/3.21 | 3.30/3.22 | 3.21/3.10 |
| $10^3/10^6$ HZ (wet) | 3.22/3.15 | 3.34/3.25 | 3.35/3.26 | 3.26/3.16 |
| Dissipation factor: |  |  |  |  |
| (Percent) $10^3/10^6$ HZ (dry) | 1.151/0.865 | 0.609/0.897 | 0.571/0.893 | 0.774/1.047 |
| (Percent) $10^3/10^6$ HZ (wet) | 0.709/0.932 | 0.573/1.063 | 0.599/0.963 | 0.834/1.115 |
| Volume resistivity ($\times 10^{15}$ ohm-cm.) | 9.77 | 8.90 | 9.57 | 8.86 |
| Surface resistivity ($\times 10^{15}$ ohm) | 5.63 | 6.11 | 6.11 | 6.11 |
| Tensile strength (p.s.i.) | 3030 | 3320 | 4820 | 2760 |

[1] Dion 6427—commercial polyester resin 2·1 maleic/isophthalic acid, available from Diamond Alkali Co.

NOTE.—HZ=cycles per second

EXAMPLE 4

A glass cloth laminate was prepared as follows: A mixture of polyphenylene ether polymer (polyphenylene ether polymer—Type 631-111, General Electric Company), polyester resin, diallyl phthalate prepolymer dissolved in diallyl phthalate monomer and dicumyl peroxide catalyst were blended together. The resin mixture was dispersed in 100 parts of acetone per 100 parts of resin by weight. Woven glass cloth was impregnated with this dispersion and allowed to dry at least 40 hours in air at room temperature. The dried glass cloth, type 181, prepregs were cut into 12" x 12" squares and stacked 13 plies deep with the warp yarns parallel. The prepreg lay-up was laminated in a flat bed press for 30 minutes at 80° C. at contact pressure, 30 minutes at 120° C. at 300 p.s.i., and 1 hour at 160° C. at 300 p.s.i. A comparison example was not made because diallyl phthalate-polyester resin mixtures are too liquid to be used in glass cloth prepregs without using thickeners. The compositions of the resin mixtures and physical properties of the laminates are set forth in Table 4.

TABLE 4.—GLASS CLOTH LAMINATES

|  | 4-1 | 4-2 |
|---|---|---|
| Polyphenylene ether polymer | 10 | 15 |
| Polyester resin [1] | 45 |  |
| Polyester resin [2] |  | 42.5 |
| Diallyl phthalate monomer | 33.75 | 31.98 |
| Diallyl phthalate prepolymer | 11.25 | 10.52 |
| Dicumyl peroxide | 2 | 2 |
| Hardness, M | 119 | 119 |
| Compression, p.s.i. at 25° C | 62,780 | 44,550 |
| Flexural strength (p.s.i.) at 25° C | 92,000 | 89,910 |
| Flexural modulus ($\times 10^{-6}$, p.s.i.) at 25° C | 3.73 | 3.91 |
| Tensile strength (p.s.i.) | 66,450 | 64,840 |
| Shear strength (p.s.i.) | 3,370 | 3,840 |
| Percent resins | 29.6 | 30.6 |
| Dielectric constant: |  |  |
| $10^3/10^6$ HZ (dry) | 4.51/4.56 | 4.75/4.73 |
| $10^3/10^6$ HZ (wet) | 4.67/4.59 | 4.79/4.73 |
| Dissipation factor: |  |  |
| (Percent) $10^3/10^6$ (dry) | .563/.653 | .655/.723 |
| (Percent) $10^3/10^6$ (wet) | .579/.696 | .690/.835 |

[1] Dion 6421.
[2] Hetron 19 is a 1:1 maleic/chlorendic anhydride polyester available from Hooker Chemical Co.

NOTE.—HZ=Cycles per second.

EXAMPLE 5

A copper clad laminate was prepared as follows using part of the impregnated glass cloth prepared in Example 4-1. Copper foil, weighing 1 ounce per square foot, was roller covered with a 10% solution of polyphenylene ether polymer, Noryl® type, in trichloroethylene. The treated copper foil was baked at 160° C. for 15 minutes to remove solvent and then placed, treated side down, on 6 plies of the impregnated glass cloth of Example 4 to form a 1/16 inch thick laminate on curing. The laminate was cured 30 minutes at 160° C. at 200 p.s.i. A comparison example was made using a prepreg solution containing 800 parts of Dion 6421 polyester and 200 parts of diallyl phthalate monomer and 20 parts of dicumyl peroxide catalyst. The impregnated glass fabric, laid up 6 plies deep, and treated copper foil, prepared as above, were laminated together for 30 minutes at 160° C. at 200 p.s.i. The comparison example was floated, copper side down, on a solder bath at 260° C. and blistering within the laminate occurred in 10–20 seconds. The copper clad laminate of this invention exhibited a peel strength of 12 pounds per inch of width, and withstood the hot solder float test for 20–30 seconds before blistering. The peel strength and solder resistance tests were run according to NEMA (National Electrical Manufacturers Association) Standards Publication No. LI-1-1966, for G-10 type copper clad laminates.

EXAMPLE 6

A series of molding compounds was prepared and molded in which 10 and 20 parts by weight of several inert fillers and fibers were added to the following formulation:

| Polyphenylene ether polymer | 80 |
|---|---|
| Diallyl phthalate monomer | 15 |
| Reactive polyester 1:1 maleic-isophthalic [1] | 5 |
| Dicumyl peroxide | 2 |
| Calcium stearate | 2 |
| Filler | 10 or 20 |

[1] Dion 6421.

The molding compounds were prepared by blending the ingredients in a ball mill to a dry powder. One hundred grams of each compound was molded in a matched metal mold at 160° C. for 5 minutes at 2000 p.s.i. into a small bowl which had exceptional impact resistance. An unfilled molding compound was also prepared and molded; it was transparent and also had exceptional impact resistance. The inert fillers used were wollastonite, silica and aluminum trihydrate; the fibers used were glass, polyester, acrylic, cellulosic and asbestos. All of the filled compounds had better hot strength, when molded, than the unfilled example.

As will be apparent to those skilled in the art, numerous modifications and variations of the processes and products illustrated above may be made without departing from the spirit of the invention or the scope of the following claims.

What is claimed is:
1. A thermosetting resin composition consisting essentially of (a) 10 to 95% by weight of a mixture of a reactive polyester, of which about 50% of the dibasic acid portion of the polyester is an unsaturated dibasic organic acid containing four carbon atoms and the alcohol moiety of the polyester is a glycol selected from the group consisting of difunctional cyclic and acyclic glycols containing two to eight carbon atoms and a polymerizable liquid monomer containing carbon-to-carbon double bond unsaturation and having a boiling point of at least 70° C., each of the components of the mixture comprising at least 5% of the total composition; (b) 5 to 90% by weight of a polyphenylene ether having a repeating structural unit of the formula

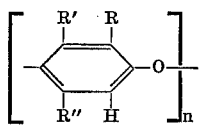

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R′ and R″ are both monovalent substituents which are the same as R and in addition, halogen, and (c) a free radical catalyst in sufficient amount to convert the polymerizable material-polyphenylene ether mixture to the thermoset state at elevated temperature.

2. The thermosetting resin composition of claim 1 in which the monomer is selected from the group consisting of diallyl orthophthalate, diallyl isophthalate, diallyl chlorendate, triallyl cyanurate, styrene, divinyl benzene and methylmethacrylate.

3. A thermosetting resin composition consisting essentially of (a) 15 to 45% by weight of a polymerizable liquid monomer containing carbon-to-carbon double bond unsaturation and having a boiling point of at least 70° C.; (b) 20 to 75% by weight of a reactive polyester, of which about 50% of the dibasic acid portion of the polyester is an unsaturated dibasic organic acid containing four carbon atoms and the alcohol moiety of the polyester is a glycol selected from the group consisting of difunctional cyclic and acyclic glycols containing two to eight carbon atoms; (c) 15 to 35% by weight of a polyphenylene ether having a repeating structural unit of the formula

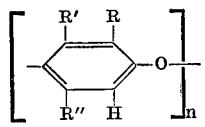

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R′ and R″ are both monovalent substituents which are the same as R and in addition, halogen, and (d) a free radical catalyst in sufficient amount to convert the polymerizable material-polyphenylene ether mixture to the thermoset state at elevated temperatures.

4. The thermosetting resin composition of claim 3 in which the monomer is selected from the group consisting of diallyl orthophthalate, diallyl isophthalate, diallyl chlorendate, triallyl cyanurate, styrene, divinyl benzene and methylmethacrylate.

5. A thermosetting resin composition consisting essentially of (a) 15–45% by weight of a mixture of a reactive polyester, of which about 50% of the dibasic acid portion of the polyester is an unsaturated dibasic organic acid containing four carbon atoms and the alcohol moiety of the polyester is a glycol selected from the group consisting of difunctional cyclic and acylic glycols containing two to eight carbon atoms and a polymerizable liquid monomer containing carbon-to-carbon double bond unsaturation and having a boiling point of at least 70° C. in which at least 5 of the 15–45% is monomer; (b) 55 to 85% by weight of a polyphenylene ether having a repeating structural unit of the formula

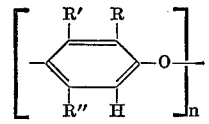

wherein the oxygen atom of one unit is connected to the benzene nucleus of the adjoining unit, $n$ is a positive integer and is at least 10, R is a monovalent substituent selected from the group consisting of hydrogen, hydrocarbon radicals free of tertiary α-carbon atom, halohydrocarbon radicals having at least two carbon atoms between the halogen atom and the phenol nucleus and being free of a tertiary α-carbon atom, hydrocarbonoxy radicals being free of a tertiary α-carbon atom, and halohydrocarbonoxy carbon atoms having at least two carbon atoms between the halogen atom and phenol nucleus and being free of tertiary α-carbon atoms, R′ and R″ are both monovalent substituents which are the same as R and in addition, halogen and (c) a free radical catalyst in sufficient amount to convert the polymerizable material-polyphenylene ether mixture to the thermoset state at elevated temperatures.

6. A filled thermosetting resin composition consisting essentially of 100 parts by weight of thermosetting resin at least 75% by weight of which is a thermosetting resin composition of claim 1, and 0–25% by weight of a diallylic phthalate prepolymer selected from the group consisting of diallyl orthophthalate and diallyl isophthalate prepolymers, and up to 400 parts by weight, per 100 parts of the total of the thermosetting resin and diallylic phthalate prepolymer, of an inert filler selected from the group consisting of inert mineral fillers and inert fibrous fillers.

7. A filled thermosetting resin consisting essentially of 100 parts by weight of thermosetting resin at least 75% by weight of which is a thermosetting resin composition of claim 3 and 0–25% by weight of a diallylic phthalate prepolymer selected from the group consisting of diallyl orthophthalate and diallyl isophthalate prepolymers, and up to 400 parts by weight, per 100 parts of the total of the thermosetting resin and diallylic phthalate prepolymer, of an inert filler selected from the group consisting of inert mineral fillers and inert fibrous fillers.

8. A filled thermosetting resin consisting essentially of 100 parts by weight of thermosetting resin at least 75% by weight of which is a thermosetting resin composition of claim 5, and 0–25% by weight of a diallylic phthalate prepolymer selected from the group consisting of diallyl orthophthalate and diallyl isophthalate prepolymers, and up to 400 parts by weight, per 100 parts by weight of the total of the thermosetting resin and diallylic phthalate prepolymer, of an inert filler selected from the group consisting of inert mineral fillers and inert fibrous fillers.

No references cited.

MELVIN GOLDSTEIN, Primary Examiner

U.S. Cl. X.R.

117—132 B, 138.8, 148; 161—195, 232; 260—32.8 R, 33.6 UA, 33.8 UA, 866